United States Patent [19]

Schuler et al.

[11] Patent Number: 5,099,645
[45] Date of Patent: Mar. 31, 1992

[54] LIQUID-SOLID PROPULSION SYSTEM AND METHOD

[75] Inventors: Alan L. Schuler, San Diego; Danny R. Wiley, Escondido, both of Calif.

[73] Assignee: General Dynamics Corporation, Space Systems Division, San Diego, Calif.

[21] Appl. No.: 541,862

[22] Filed: Jun. 21, 1990

[51] Int. Cl.$^5$ .................. F02K 9/28; F02K 11/00
[52] U.S. Cl. ......................... 60/219; 60/251; 60/260; 60/267
[58] Field of Search ............ 60/257, 251, 267, 260, 60/204, 219, 233, 39.23, 39.29

[56] References Cited

U.S. PATENT DOCUMENTS

| | | | |
|---|---|---|---|
| 3,048,966 | 8/1962 | Ferand | 60/267 |
| 3,107,485 | 10/1963 | Toulmin | 60/260 |
| 3,159,104 | 12/1964 | Hodgson | 60/251 |
| 3,178,885 | 4/1965 | Loughran | 60/251 |
| 3,295,323 | 1/1967 | Holzman | 60/260 |
| 3,350,887 | 11/1967 | Leunig et al. | 60/251 |
| 3,368,353 | 2/1968 | Allport | 60/257 |
| 3,597,923 | 8/1971 | Simon | 60/260 |
| 3,782,112 | 1/1974 | Muzzy | 60/260 |
| 4,771,601 | 9/1988 | Spies | 60/260 |

Primary Examiner—Richard A. Bertsch
Assistant Examiner—Timothy S. Thorpe
Attorney, Agent, or Firm—John R. Duncan; Frank D. Gilliam

[57] ABSTRACT

A liquid-solid propulsion system having a tank of liquid oxygen and a high pressure chamber loaded with solid grain fuel with a portion of the liquid oxygen being passed through a heat exchanger to convert the liquid oxygen to gaseous oxygen. The gaseous oxygen is directed to the chamber or solid grain fuel to induce a fuel rich gas burn that is directed to a thrust chamber which also receives liquid oxygen to increase the characteristic velocity of the exhaust and thereby provide the specific impulse of the propulsion system. The gaseous oxygen is also directed to the liquid oxygen tank to pressurize the flow of liquid oxygen from the tank. Valves are interposed to control the flow of liquid and gaseous oxygen to provide the required mixture ratio in the thrust chamber for optimum specific impulse or to terminate the thrust of the propulsion system. A method for providing the liquid-solid propulsion system is also disclosed.

17 Claims, 1 Drawing Sheet

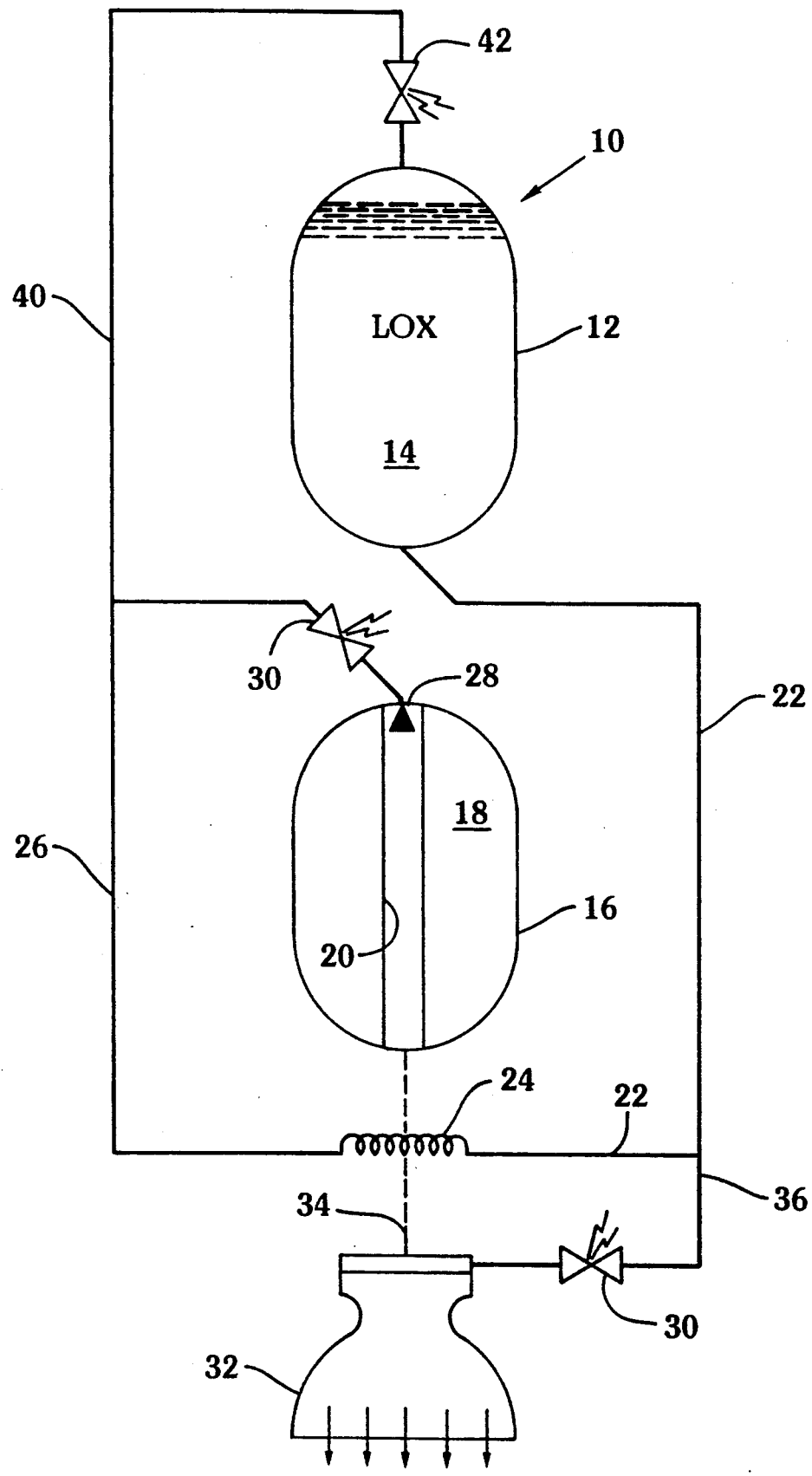

LIQUID-SOLID PROPULSION SYSTEM AND METHOD

BACKGROUND OF THE INVENTION

The present invention relates to an improvement in rocket motors and more particularly, but not by way of limitation, to a high performance, safe, non-polluting, thrust controllable liquid-solid propulsion system.

Rocket propulsion systems have found extensive application as assist take-off devices, boosters for missiles, projectiles and various spacecraft. The systems previously used may be classified into two basic types in accordance with the physical state of the fuel and oxidizer employed, i.e., liquid propellant or solid propellant. A third type, a gaseous system is undesirable because of the very large space requirements in order to provide an adequate fuel supply.

The liquid propellant systems have advantages in controllability, low cost, and high performance but all liquid oxidizing agents present severe storage and handling problems. For example, some liquid oxidizers are corrosive, unstable and toxic while others are toxic and volatile and others require insulation and refrigeration. In addition, conventional liquid systems require complex feed mechanisms and precise control to eliminate the hazard of explosion. The solid propellant systems are simpler and may be more reliable than the liquid propellant systems, but they are explosive, non-controllable and expensive.

Several systems employing fuels and oxidants, respectively in different physical states, had been developed. One such system comprised the reaction of aluminum powder suspended in liquid hydrocarbon with liquid oxygen and involved the attendant disadvantages of the liquid type systems noted above. Another system proposed the use of liquid nitrous oxide for burning solid carbon and still another system proposed burning a solid plastic with a liquid oxidizer. The latter two systems also involved the problem of storing and handling a highly corrosive, unstable, or toxic liquid.

Solid oxidizers were developed to provide auxiliary, combustion-supporting agents for fuel rich solid propellants. These oxidizers were included in a rocket chamber containing a solid fuel, e.g., nitroglycerine or nitrocellulose, for supplying additional oxygen to promote combustion of the solid fuel and thereby increase the combustion efficiency. This was essentially a solid type system and embraced the disadvantageous features of non-controllability, expensiveness and short duration operation.

Certain prior art patents while displaying the shortcomings discussed are of interest. For example, U.S. Pat. No. 4,214,439 is of interest in that it shows a multi-component propulsion system utilizing metallic fuel particles and a carrier gas as a propellant medium. Liquid hydrogen is pumped through a fuel regenerative passage in the walls surrounding the rocket housing to act as a coolant for the combustion chamber walls and becomes vaporized during this cooling step. The vaporized hydrogen is then pumped into a fluidization chamber through a bed of metallic particles to maintain them in a fluidized condition. The fluidized particles and the hydrogen are then directed to the combustion chamber to be combined with a liquid oxidizer.

U.S. Pat. No. 3,136,119 discloses a fluid-solid propulsion unit wherein compressed air and liquid fuel are introduced into a combustion chamber lined with a hollow cylindrical grain of solid oxidizing material. The liquid fuel and compressed air are initially burned and applied to the solid grain until the intense heat produced causes the grain to decompose thereby evolving oxygen which reacts with more fuel to further intensify the heat released until the combustion of the solid grain becomes self sustaining. The supply of oxygen is then shut off.

U.S. Pat. No. 4,441,312 shows a combined cycle ramjet engine wherein the metallic wall of the combustion chamber of a combined rocket-ramjet engine is provided with solid ramjet fuel overlaid with rocket fuel. After the consumption of the rocket fuel in the boost portion of the flight, the solid ramjet fuel burns and ablates protecting the metallic combustion chamber wall from high temperatures during the cruise phase of the missile flight.

U.S. Pat. No. 3,844,118 shows a solid fuel ramjet powered missile having the air inlets positioned adjacent the aft end of the fuel grain with a channel provided adjacent the fuel grain to provided primary air into the forward end of the fuel grain with the secondary air being supplied directly to the secondary combustor. A valve is provided in the primary air flow channel to control the air flow into the fuel grain.

U.S. Pat. No. 3,073,110 shows a propellant utilization control system which controls the fuel and oxidizer flow to a sustainer engine of a rocket system so that both the propellant tank containing the liquid oxygen and the propellant tank containing the fuel are emptied at the same time. Utilizing a closed loop control system, the ratio of the oxidizer to the fuel supplied to the engine is maintained substantially equal to the ratio of the oxidizer to the fuel in the propellant tanks during the operating period of the engine system.

In light of the foregoing review of previous rocket propulsion system and illustrative patented systems and their attendant shortcomings the present invention has as a general object, the provision of a rocket propulsion system which combines the beneficial features of both the liquid and solid type systems but avoids the undesirable features of each.

SUMMARY OF THE INVENTION

Briefly stated, the present invention contemplates a high performance, safe, non-polluting, thrust controllable liquid-solid propulsion system wherein liquid oxygen is contained within a forward high pressure tank. A high pressure chamber is loaded with a solid fuel grain with no oxidizer present. A conduit from the liquid oxygen tank is connected to a heat exchanger which converts the liquid oxygen to gaseous oxygen after which the gaseous oxygen is sprayed into the chamber containing the solid fuel grain to support a fuel rich combustion (around 2300F) which takes place within a central bore provided in the fuel grain. The burning gases exhausted from the fuel grain chamber provide heating for the heat exchanger and pass into a thrust chamber which receives liquid oxygen directly from the liquid oxygen tank to increase the characteristic velocity of the exhaust gases and the specific impulse of the propulsion system. Valves control the introduction of the vaporized oxygen into the solid fuel grain chamber and the injection of the liquid oxygen into the thrust chamber to provide the required mixture ratio in the thrust chamber for optimum specific impulse.

Oxygen that has been gasified by passage through the heat exchanger is also introduced into the tank of liquid oxygen to pressurize the liquid oxygen by the differential in the liquid and gaseous oxygen densities created by the low temperature combustion. A method of providing this liquid-solid propulsion system is also disclosed.

Further features and attendant advantages of this invention will become evident from the following detailed description when read in conjunction with the accompanying drawing.

BRIEF DESCRIPTION OF THE DRAWING

The single Figure of the drawing is a simplified schematic diagram of a liquid-solid propulsion system constructed in accordance with a preferred embodiment of the invention.

DETAILED DESCRIPTION OF A PREFERRED EMBODIMENT

Referring now to the drawing in detail, the reference character 10 generally designates a liquid-solid propulsion system constructed in accordance with the present invention. The liquid propulsion system 10 includes a forward high pressure tank 12 (around 650 psig) which contains liquid oxygen 14 and a high pressure chamber 16 (about 650 psig) which is loaded with a solid fuel grain 18 which contains no oxidizer but which is only solid fuel. The solid fuel grain 18 is loaded into the chamber 16 in a manner to provide a longitudinally extending central bore 20 to support low temperature combustion therewithin.

A suitable conduit 22 is connected from the tank 12 of liquid oxygen to a suitable means to convert the liquid oxygen to gaseous oxygen. In the illustrated embodiment of the present invention, this conversion takes the form of a suitable heat exchanger 24 which is advantageously arranged to receive heat from the low temperature combustion which takes place within the solid grain fuel tank 16. After the liquid oxygen has been vaporized to a gaseous state by the heat exchanger 24 it passes via a suitable conduit 26 to an entry injection port 28 located at the fore end of the solid fuel grain tank 16. A valve 30 is interposed in the conduit 26 to control the amount of gaseous oxygen that is injected or sprayed into the bore 20 to support combustion with the solid fuel grain 18 within tank 16. Since only gaseous oxygen is introduced into the tank 16, the tank 16 may be constructed from the usual high strength steels used in spacecraft applications. If liquid oxygen were to be injected into the tank 16, its cryogenic temperature would preclude the use of those steels in any area exposed to the liquid oxygen spray.

As the gaseous oxygen flows into tank 16 via port 28, a fuel rich combustion ratio is achieved with a resultant low temperature of about 2300F. The exhaust from the combustion of the fuel grain 18 passes out of the tank 16 and through the heat exchanger 24 to vaporize the liquid oxygen. The exhaust continues into a thrust chamber 32 in a path, as shown generally by the dotted line 34, where additional liquid oxygen flowing through conduit 36 and conduit 22 from tank 12 is injected to increase the characteristic velocity of the exhaust gases and, thus, the specific impulse of the propulsion system.

A suitable valve 38 is interposed in the conduit 36 to control the flow of the additional oxygen into the thrust chamber 32. High performance of the system 10 is achieved by control of the valves 30 and 38 to provide the required controlled mixture ratio in the thrust chamber 32 for optimum consistently high specific impulse.

A conduit 40 is connected to conduit 26 to permit the introduction of the gaseous oxygen into the upper portion of the tank 12. A valve 42 is interposed in the conduit 40 to control the rate of flow of the gaseous oxygen into the liquid oxygen tank 12. The liquid oxygen 14 flows from the tank 12 as a result of the differential densities between the liquid and gaseous oxygen. Thus, autonomous pressurization of the liquid oxygen is provided.

While the conversion means was illustrated as heat exchanger 24, the liquid oxygen could be gasified by passing liquid oxygen around the thrust chamber 32 which would also cool the thrust chamber 32. Such an arrangement for regeneratively cooling and vaporization is seen, for example in U.S. Pat. No. 4,214,439 discussed above.

Thus, it has been illustrated that the present invention provides a high performance, safe, non-polluting thrust controllable liquid-solid propulsion system. Control of the valves 3 and 38 yield high performance for the system 10 since they permit the precise required mixture ratio in the thrust chamber 32 for optimum specific performance. The system 10 is safe since during manufacture, transport, assembly, erection, and during all other functions prior to lift off or launch, the fuel is inert and oxidizer is not present. During flight of the system 10, conflagration cannot occur as the fuel is solid within its high pressure case and the liquid oxygen is contained within its separate high pressure tank.

The system 10 is non-polluting since liquid oxygen is a nonpolluting oxidizer. The system 10 is also eminently controllable as varying or closing valves 30, 38, and 42 provide precise control of the system 10 to provide high consistent specific impulse or to provide throttling or termination of thrust if the mission is to be aborted.

For ease of illustration and to promote understanding of the invention, the illustrated embodiment is shown in its diagrammatic sense with various electrical systems, control systems, start up and initial fire up arrangements and the like have been omitted.

Obviously numerous modifications and variations of the invention are possible in the light of the above teachings. It is therefore to be understood that within the scope of the appended claims the invention may be practiced otherwise than as specifically described herein.

We claim:
1. A liquid-solid propulsion system comprising:
A source of liquid oxygen;
a source of solid grain fuel;
conversion means connected to the source of liquid oxygen and arranged to convert liquid oxygen into gaseous oxygen;
first controllable means adapted to introduce a first portion of said gaseous oxygen into the source of solid grain fuel to induce a fuel rich gas burn therewith and to introduce a second portion of said gaseous oxygen back into the source of liquid oxygen whereby said second portion of gaseous oxygen pressurizes said liquid oxygen to provide flow of liquid oxygen from said source in a predetermined manner;
a thrust chamber coupled to the source of solid grain fuel to receive the burning exhaust gases from the fuel rich burn occurring within the source of solid grain fuel; and
second controllable means connected to the source of liquid oxygen and adapted to introduce liquid oxy- gen into the thrust chamber to increase the characteristic velocity of the exhaust gases and thereby provide the optimum impulse of the propulsion system.

2. The liquid-solid propulsion system of claim 1 wherein the source of liquid oxygen comprises a tank of liquid oxygen.

3. The liquid-solid propulsion system of claim 2 wherein the liquid oxygen tank comprises a high pressure tank adapted to carry liquid oxygen at approximately 650 psig.

4. The liquid-solid propulsion system of claim 1 wherein the source of solid grain fuel comprises a high pressure chamber loaded with solid grain fuel.

5. The liquid-solid propulsion system of claim 4 wherein the solid grain fuel contains no oxidizer and is arranged to provide a longitudinally extending central bore.

6. The liquid-solid propulsion system of claim 5 wherein the chamber is constructed of a high strength steel.

7. The liquid-solid propulsion system of claim 4 wherein the first controllable means includes a controllable valve to control introducing said first portion of gaseous oxygen into one end of the high pressure chamber loaded with solid grain fuel.

8. The liquid-solid propulsion system of claim 7 wherein the first controllable means further includes a controllable valve to control introduction of said second portion of gaseous oxygen into the liquid oxygen tank.

9. The liquid-solid propulsion system of claim 4 wherein the conversion means comprises a heat exchanger which receives heat from the fuel rich burn occurring within the chamber loaded with solid grain fuel.

10. The liquid-solid propulsion system of claim 4 wherein the conversion means comprises means coupling the liquid oxygen to the thrust chamber to receive heat from the exhaust gases flowing therethrough to convert the liquid oxygen to gaseous oxygen.

11. The liquid-solid propulsion system of claim 1 wherein the second controllable means includes a valve to control the flow of liquid oxygen into the thrust chamber.

12. The liquid-solid propulsion system of claim 1 wherein the first and second controllable means are variable to throttle or terminate the thrust of the propulsion system.

13. A method for provident specific impulse for a propulsion system which comprises:
provident a source of liquid oxygen;
provident a source of solid grain fuel;
introducing a first portion of said gaseous oxygen into the solid grain fuel to provide a fuel rich gas burn;
introducing a second portion of said gaseous oxygen into the source of liquid oxygen to provide a flow of liquid oxygen;
coupling the exhaust gases of the fuel rich gas burn from the source of solid grain fuel to a thrust chamber; and
introducing liquid oxygen from said source into the thrust chamber to increase the characteristic velocity of the burning exhaust gases and thereby provide the optimum specific impulse of the propulsion system.

14. The method of claim 13 wherein the conversion step is provided by using heat from the exhaust gases emanating from the source of solid grain fuel to convert the liquid oxygen to gaseous oxygen.

15. the method of claim 14 wherein the introduction of said first portion of said gaseous oxygen into the solid grain fuel is controllable.

16. The method of claim 15 wherein the introduction of said first portion of said gaseous oxygen into the liquid oxygen is controllable.

17. The method of claim 16 wherein the introduction of the liquid oxygen into the thrust chamber is controllable whereby varying said controllable introductions permit the throttling or termination of the propulsion system.

* * * * *